United States Patent Office 3,391,522
Patented July 9, 1968

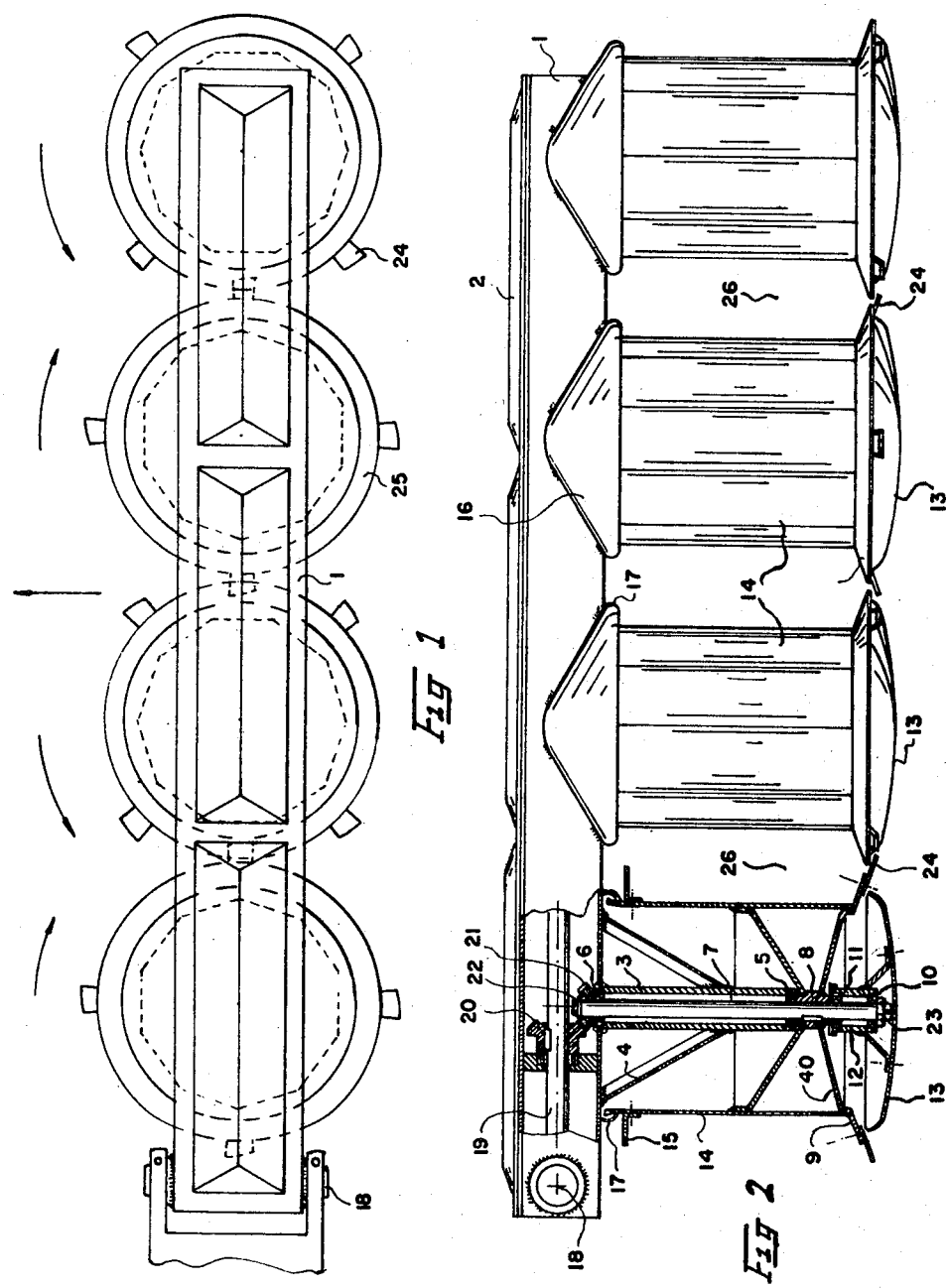

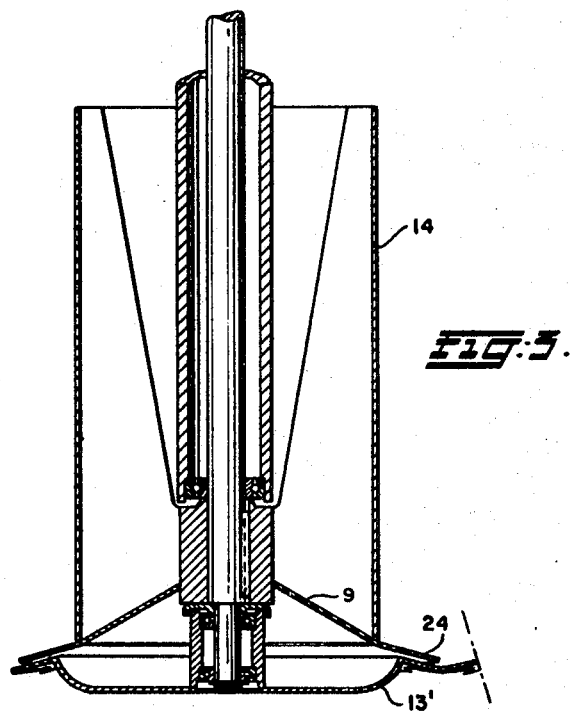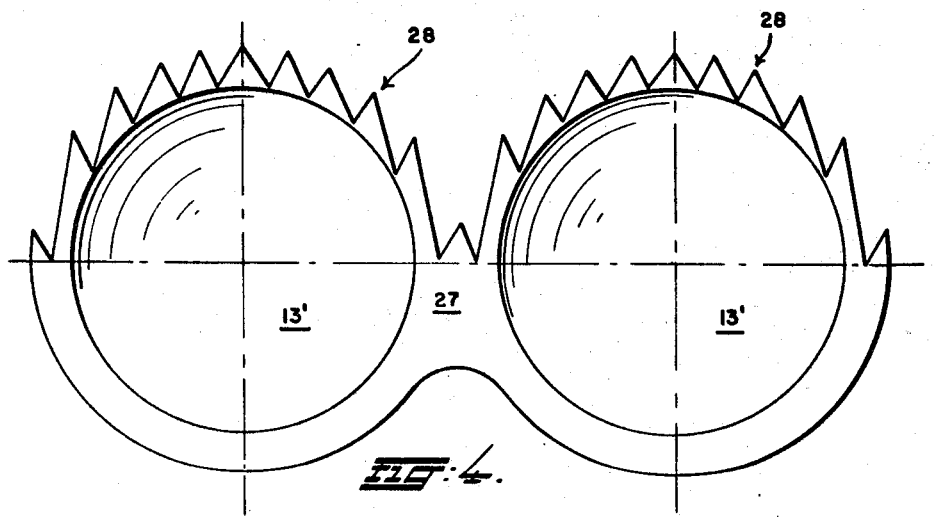

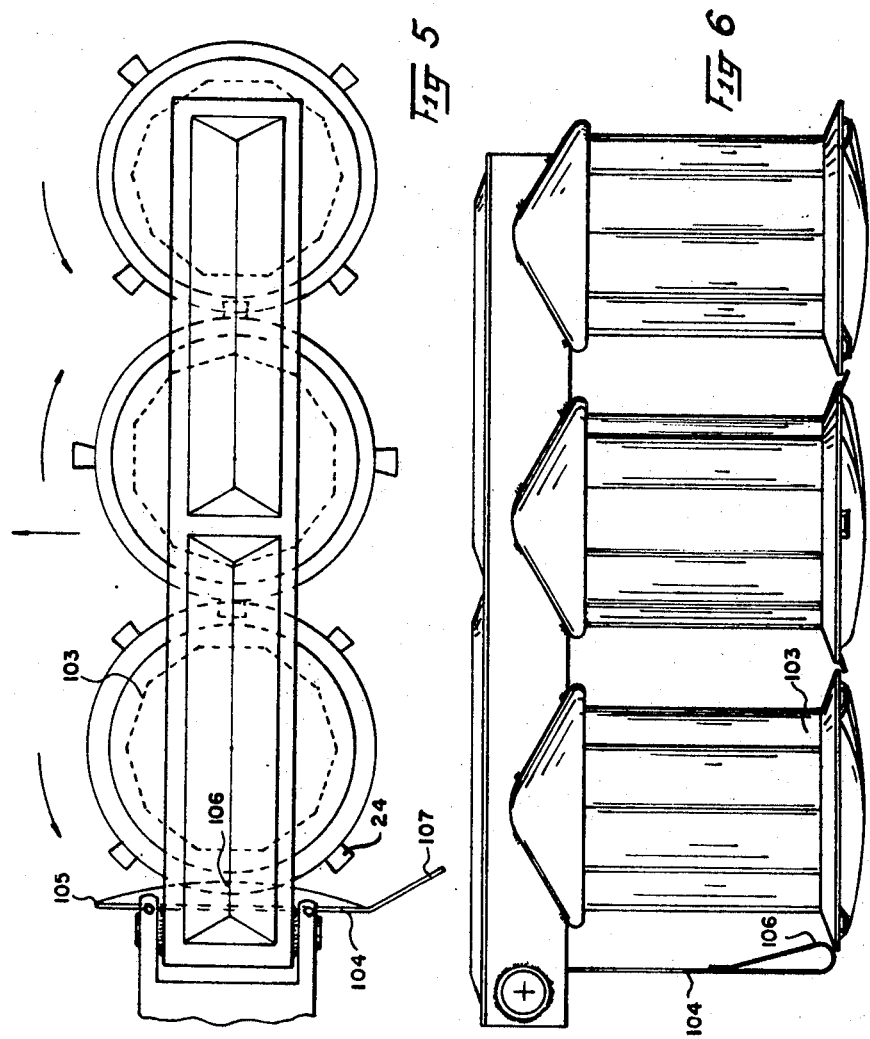

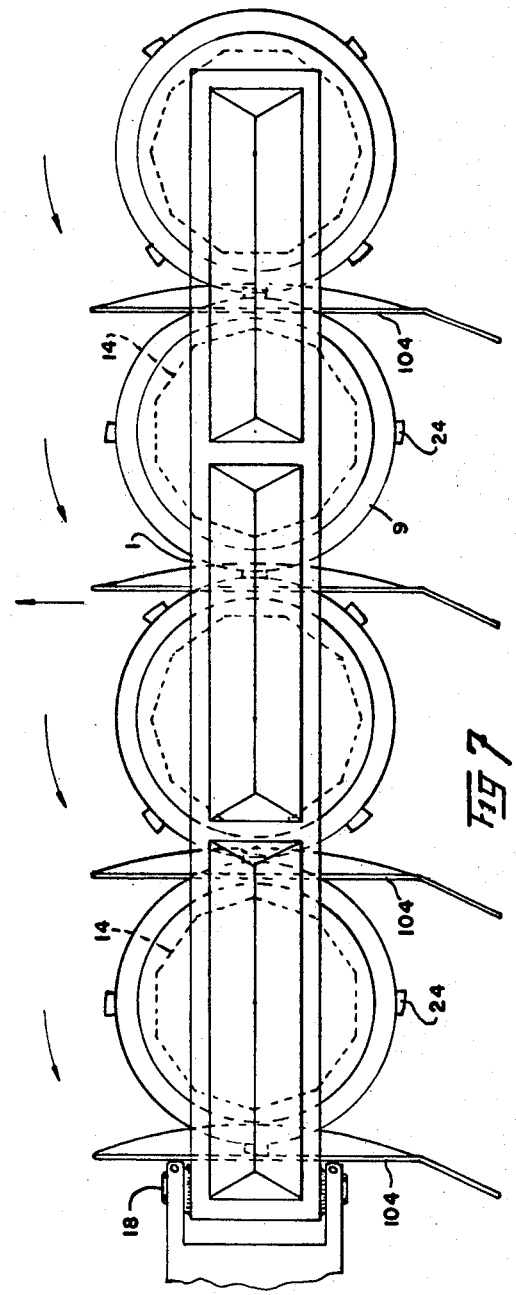

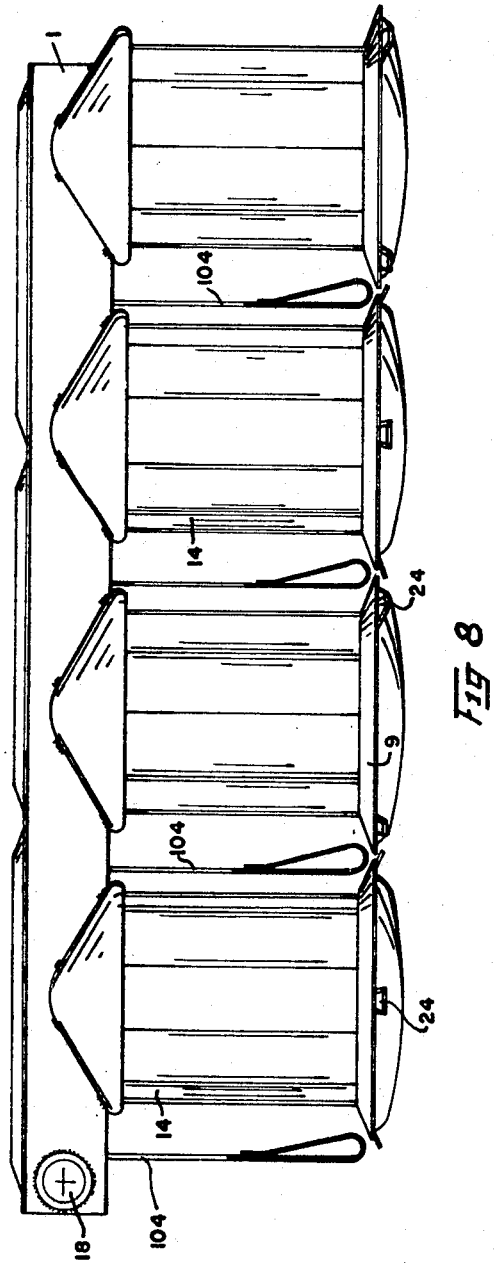

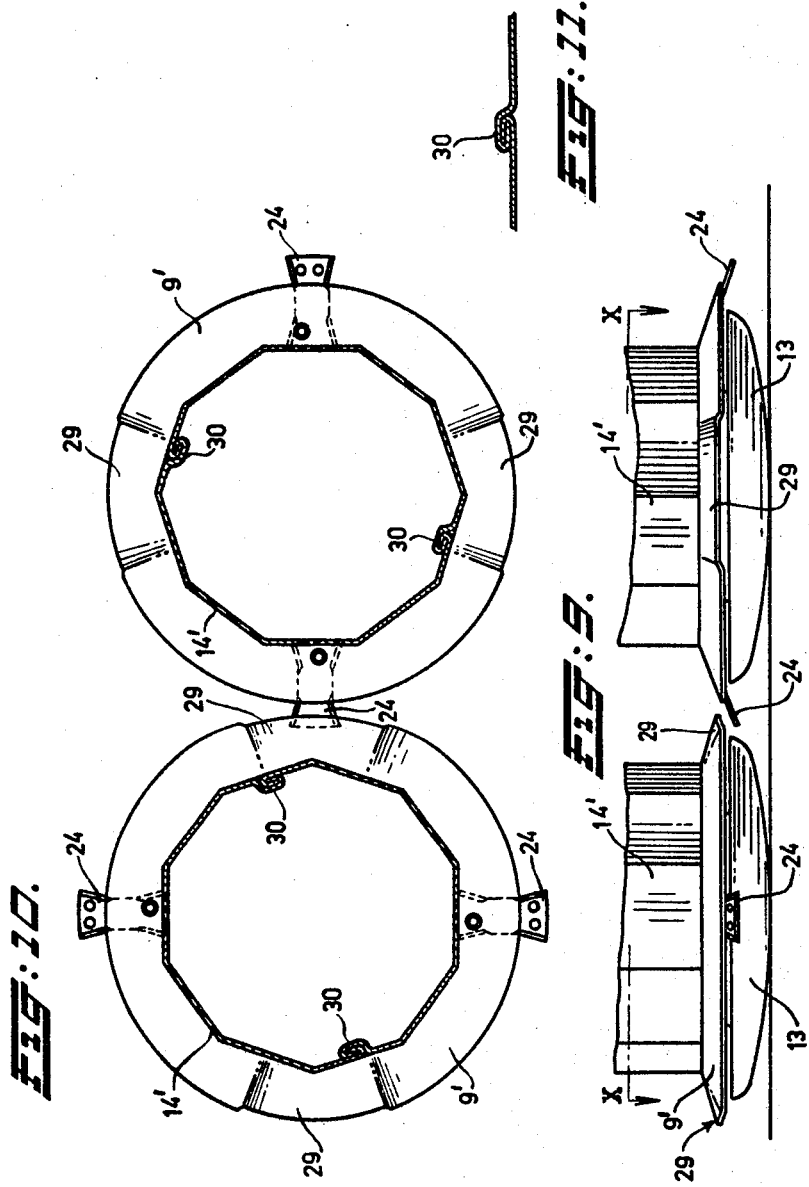

3,391,522
MOWING MACHINES
Petrus Wilhelmus Zweegers, Eindhovenscheweg 2,
Geldrop, Netherlands
Filed July 6, 1965, Ser. No. 469,395
Claims priority, application Netherlands, July 11, 1964,
6407939
14 Claims. (Cl. 56—6)

ABSTRACT OF THE DISCLOSURE

Mowing machine including a pair of rotatable drums, each carrying an outwardly projecting collar at its lower end and cutters spaced apart around and below the periphery of the collar. Each collar overlaps the circular path traced by cutters of adjacent drum. Sides of drums and collars define discharge slot between drums through which cut crop is delivered.

---

This invention relates to a mowing machine having a frame which carries at least one drum so as to be rotatable about a substantially vertical axis, one or more cutters being rotatable about the same shaft as the drum and being mounted on the circumference of a circle near the lower end of the drum, a drive arrangement for the drum and for the cutters being provided.

In a known machine of this type, the drum is perforated and the lower edge thereof is provided with a square plate, the four corners of which form the cutters and which plate is situated in a radial plane of the drum. In this known machine, the danger exists that the mowed crop such as grass is repeatedly engaged by the cutters and is thus divided into very small pieces which make them worthless as hay. Further, one tries to discharge the mowed crops in this known machine in that the crops cling to the drum perforations and are thus carried along, but this has proven to be impractical.

It is the object of the invention to ensure an efficient discharge of the mowed crops without the crops being repeatedly engaged by the cutters. According to the invention, this object is obtained in that laterally of the profiled e.g. polygonal drum, there is a discharge slot defined on one side by the drum and on the other side by an adjacent member. The lower end of the slot is at least partially closed by an element covering the cutting circle of the cutters in the area of the slot, such that the drum discharges the mowed crop through the discharge slot without repeated engagement with the cutters. Thus, it is possible with the machine according to the invention to lay one or more swaths of the mowed crops, in which the crops have been retained in their full length.

The adjacent member which laterally defines the discharge slot may be a second drum which is driven synchronously with but in opposite sense to the first drum. However, the adjacent member which laterally defines the discharge slot may also be a substantially vertical guide plate extending in the direction of movement of the mowing machine as a whole.

Preferably, the lower end of the drum is provided with a collar, and the cutters are mounted against the lower side of the collar. When the mowing machine has several drums which rotate in equal or opposite directions, the cutting circle of the cutters of the several drums preferably overlap each other, but the cutters are so distributed around the circumference of the collars of the several drums that they do not touch each other when the drums rotate synchronously.

In such a machine, the closure of the lower end of the discharge slot may be obtained by the collars of adjacent drums coming so close to each other that the collar of one drum covers the cutters of the next drum in their overlapping area.

The upper end of the discharge slot between two drums may be closed by a collar mounted on the upper part of the drums and this collar may also be provided with cutters.

The guide plate, which may be used for defining the discharge slot, may have a front edge, an arched intermediate part and an inclined rear part, which shape ensured a good discharge during experiments.

In the following description, the invention will be further illustrated with reference to the accompanying drawings.

FIG. 1 is a plan view of one embodiment of a mowing machine according to the invention.

FIG. 2 is a rear view of said machine.

FIG. 3 is an axial section of a drum unit in which the support members of two adjacent drums are a unitary structure.

FIG. 4 is a view from below of the support member according to FIG. 3.

FIG. 5 is a plan view of a machine having three drums.

FIG. 6 is a rear view of the machine of FIG. 5.

FIG. 7 is a plan view of a machine having four drums which rotate in the same direction.

FIG. 8 is a rear view of the machine according to FIG. 7.

FIG. 9 is a horizontal section through a pair of drums according to another embodiment of the invention.

FIG. 10 is a fragmentary rear view of the drums of FIG. 9.

FIG. 11 is an enlarged fragmentary view of a portion of FIG. 9.

The mowing machine according to FIGS. 1 and 2 has a box-shaped frame beam 1 which is closed by a profiled cover 2. The left end of the frame beam 1 is provided with a pair of journals 18 with which it is so suspended from a tractor that it can pivot about a horizontal axis, and it protrudes laterally of the tractor. In the suspension device, there is also a vertical pivot axis so that the frame beam 1 can be pivoted to the rear of the machine when transported over the road. The suspension of the frame beam 1 is preferably connected to the three point linkage of the tractor, so that the position of the frame beam 1 may be adjusted.

Spaced along the length of the frame beam 1, the lower side thereof carries four downwardly directed tubes 3 which are welded to the beam 1, the connection being reinforced by inclined braces 4. Bearings 5 and 6 are mounted in each tube 3 and a shaft 7 is journaled in said bearings. Immediately below the bearing 5, the hub 8 of a drum 14 is fixed on the shaft 7 by means of a cotter connection. Below the hub 8, the shaft 7 carries two further bearings 10 and 11 which support the hub 12 of a support member 13 which rests on the ground. In the embodiment according to FIGS. 1 and 2, each support member 13 is saucer shaped and it is journaled on the shaft 7 for free rotation thereon.

The drum 14 is profiled, e.g. in the shape of a regular decagon, and it is connected to the hub via two ring flanges e.g., the lower ring flange 40 being continued outside of the drum so as to form a collar. Said collar 9 carries the cutters 24 against its lower surface. Although FIGS. 1 and 2 show four cutters 24 on each collar 9, two cutters per collar can be used advantageously in many cases. The cutter 24 is fixed in abutting relationship against the conical lower surface of the collar 9, preferably so that it can easily be replaced and so that it can pivot away when hitting a hard obstacle. The cutters of adjacent drums are so staggered with respect to each other that when the drums rotate, the cutters of adjacent drums do not touch each other. When two adjacent drums rotate in opposite directions (FIG. 1), the distribution of the cutters over the drums is not very critical, but when the drums rotate in the same direction and especially when four cutters per drum are provided (FIG. 7), the dimensions of the cutters and their distribution over the circumference of the drums should be adjusted very carefully so as to prevent mutual touching of the cutters during the rotation.

The upper part of the periphery of the drum 14 may carry a ring 15 for closing the upper side of the discharge slot between two adjacent drums and this ring may also carry cutters. The upper end of each drum may be closed by a conical cap 16 welded to the frame beam 1. The inwardly bent edge 17 of the cap 16 fits with a small clearance about the circumference of the drum 14, so that it prevents plants and dirt from entering the drum.

The shafts 7 are driven from the tractor, i.e. by means of a shaft journaled concentrically in the journals 18 and driving a main shaft 19 positioned in the frame beam 1. The main shaft 19 carries a bevel gear 20 near each drum which engages with a bevel gear 21 fixed on the upper end of the shaft 7. The direction of rotation of any drum 14 is determined by the fact whether the associated bevel gear 20 is mounted to the right or to the left of the engaging bevel gear 21. In the embodiment according to FIGS. 1 and 2, the gears 20 are alternately mounted to the right and to the left of the associated gear 21, whereas in the embodiment according to FIGS. 7 and 8, all gears 20 are mounted to the same side of the associated gear 21.

The spacing of the drums over the length of the frame beam 1 with respect to the diameters of drum, collar and cutter circle is so chosen that between each pair of drums which discharge the plants between them in rearward direction, there is a discharge slot 26, the width of which is at least about ⅕ and at most about ⅓ of the distance between the most remote points of the cutting circle of the two cooperating drums at both sides of the discharge slot. The diameter of the collar 9 is so chosen that the collars of two adjacent, co-operating drums have as little clearance as possible to each other, so that the collars 9 almost fully close the lower end of the discharge slot 26 and the collars mutually cover the cutters of the other drum in this area.

When mowing, the machine is moved over the field by the tractor in the direction indicated by an arrow in FIG. 1, and the drums 14 rotate in the directions indicated by arrows in FIG. 1. The cutters 24 cut the plants and the profiled drums convey the plants, the plants resting upon the collar 9, so that they move through the discharge slot 26 between the first and the second or the third and the fourth drums respectively (counting from the left in FIG. 1) without further contact with the cutters, and the plants are laid in the shape of two swaths behind the two discharge slots. The air current generated by the drums plays an important part in the discharge of the plants.

When mowing, the cutters 24 describe a truncated cone because they are positioned in abutting relationship against the lower surface of the conical collar 9. Their inclined position favors on the one hand the cutting action because the angle is favorable for cutting the plants, and on the other hand, its inclined position ensures that when a cutter breaks away from the collar, it will immediately dig into the ground and will not fly away.

In the embodiment according to FIGS. 1 and 2, each drum has its own saucer shaped support member 13, which moves over the ground when mowing so as to follow any unevenness of the ground by freely rotating about its axis. However, in the embodiment according to FIGS. 3 and 4, the support members of each pair of operating drums form a unitary structure comprising two saucer shaped parts 13' and a narrow connecting portion 27. Thus, the support members are held immovably upon their shafts. In this latter embodiment, the front edges of the saucer shaped parts 13', that is to say the edges directed into the direction of movement of the machine, are provided with cutting teeth 28 which are positioned immediately below the cutting circle of the cutters 24 (not visible in FIGS. 3 and 4) so as to perform a scissor-like action in combination with the cutters.

In an embodiment, not shown, the collar 9 and the drum 14 can be journaled on the shafts 7 independently of each other and they can each be provided with an individual drive, so that it is possible to give the cutters 24 the desired peripheral speed for the best cutting action, whereas the drum 14 is given the desired peripheral speed for the best discharge of the mowed crops. In this embodiment, the speed of the drum 14 may be smaller than the speed of the collar 9, because the latter should have a very high speed (2000–3000 revolutions per minute) to obtain the most favorable cutting speed in the operative part of the cutting circle. The cutting speed is at least about 40 m./sec. and preferably about 70 m./sec.

In another embodiment, shown in FIGS. 9–11, the collar 9' can be arched upwards in the areas 29 in which the cutters of the adjacent drum move below the collar 9' when passing below the discharge slot, so that there is room for the cutters to be forced upwards, e.g. when hitting a hard obstacle, without touching the adjacent collar. The drum 14' may have the shape of a regular decagon in section and comprises preferably two separate halves (FIG. 10), which are hooked together at 30, i.e., the adjacent edges of both halves are hook shaped in section, so that the two halves hold together even without being welded together (see FIG. 11).

In the embodiment according to FIGS. 1 and 2, each pair of adjacent drums co-operates to discharge the mowed crop through the slot between the drums in rearward direction. In the embodiment according to FIGS. 5 and 6, there are only three drums, which may be necessary with certain machine widths. In FIG. 5, the two drums at the right side co-operate in the manner already described, whereas the left drum 103 in FIG. 5 co-operates with a guide plate 104 for forming a discharge slot, the guide plate 104 being positioned substantially parallel to the direction of movement of the machine and comprising a front edge 105, an arched lower portion 106 and an inclined rear portion 107. The portion 106 of the guide plate ensures that the crop conveyed through the discharge slot in rearward direction, does not contact the cutters 24.

It is also possible, see FIGS. 7 and 8, that all drums rotate in the same direction and there is a guide plate 104 laterally of each drum so as to form a discharge slot together with the associated drum. With such a machine, one can lay four narrow swaths instead of two wide swaths, which promotes the fast drying of the plants.

It is obvious that variants are possible within the scope of the invention. The drums 14 may e.g. have a cylindrical section and they may be profiled by fixing one or more bars on their periphery, in longitudinal direction of the drum.

What I claim is:

1. Mowing machine comprising a frame, said frame carrying a series of drums each rotatable about its axis, said axis being substantially vertically positioned, a collar being mounted adjacent and concentric to the lower end of each drum and one or more cutters being attached to the lower surface of each collar, said collars with cutters being rotatable about the same axis as the associated drum and a drive for each drum and each collar being provided, each pair of cooperating drums defining a discharge slot between them, the lower end of said discharge slot being substantially closed by the collars of both drums concerned, the circular paths traced by the cutters of both drums overlapping each other so that the collar of one drum covers the circular path traced by the cutters of the adjacent drum in the area of the discharge slot and the cutters being so distributed over the circumference of the collars that when the drums are synchronously rotated, the cutters of both drums do not touch each other and the drums move the cut crops through the discharge slot in rearward direction without repeated contact with the cutters.

2. Mowing machine according to claim 1, characterised in that there is the smallest possible clearance between the collars on both sides of a discharge slot so that the collar of one drum covers as much as possible of the overlapping area of the circular path traced by the cutters of the adjacent drum.

3. Mowing machine according to claim 1 characterised in that the collar is fixed to the associated drum.

4. Mowing machine according to claim 1, characterised in that the peripheral speed of the cutters on the operative diameter of the cutting circle is at least about 40 m./sec. and preferably about 70 m./sec.

5. Mowing machine according to claim 1, characterised in that the width of the discharge slot is at least about ⅛ and at most about ⅓ of the distance between the most remote points of the circular path traced by the cutters of the two co-operating drums at both sides of a discharge slot.

6. Mowing machine according to claim 1, characterised in that the section of the drum has the shape of a regular decagon.

7. Mowing machine according to claim 1, characterised in that the drum is divided into two halves along an axial plane, said halves being provided with hook shaped longitudinal edges so that the halves are held together by interengagement of their edges.

8. Mowing machine according to claim 1, characterised in that the collar has the shape of a truncated cone whose sides converge upwardly, and the cutters are attached to the lower surface of the cone and at an incline to the horizontal.

9. Mowing machine according to claim 1, characterised in that the parts of the collar which cover the cutters of the adjacent cooperating drum as they rotate are arched upwards.

10. Mowing machine according to claim 1, characterised in that the open upper end of the drum is closed by a cover fixed to the frame.

11. Mowing machine according to claim 10, characterised in that the cover has the shape of a conical cap, the lower edge of which is turned inwards so as to co-operate with the upper end of the drum for preventing entrance of plants and dirt into the drum.

12. Mowing machine according to claim 1, characterised in that the lower end of the drum is closed by a saucer shaped support member journalled on the drum shaft.

13. Mowing machine according to claim 12, characterised in that the support members of adjacent drums are connected with each other or form a unitary structure and their front edge, which is the edge directed in the direction of movement of the machine, is provided with cutting teeth which co-operate with the cutter in a scissor-like action.

14. Mowing machine according to claim 1, characterised in that the upper side of the discharge slot between the drums is closed by a collar mounted on the upper part of the drum.

References Cited

UNITED STATES PATENTS

| | | | |
|---|---|---|---|
| 1,432,014 | 10/1922 | Brown | 56—320 |
| 1,656,105 | 1/1928 | Durkee | 56—295 X |
| 2,489,059 | 11/1949 | Surgi | 56—192 |
| 2,489,204 | 11/1949 | Sprick et al. | 56—503 X |
| 2,495,032 | 1/1950 | Stuhl | 56—192 |
| 2,697,319 | 12/1954 | Porter | 56—25.4 |
| 2,953,892 | 9/1960 | Van der Lely et al. | 56—377 |
| 3,049,852 | 8/1962 | Jacobson | 56—23 |

FOREIGN PATENTS

| | | |
|---|---|---|
| 228,943 | 6/1960 | Australia. |

RUSSELL R. KINSEY, *Primary Examiner.*

ANTONIO F. GUIDA, *Examiner.*